United States Patent [19]

Satterfield et al.

[11] Patent Number: 5,969,450
[45] Date of Patent: Oct. 19, 1999

[54] ARMATURE ASSEMBLY WITH CREEPAGE SHIELD

[75] Inventors: R. Gerald Satterfield, Pickens; W. Keith Glenn, Anderson, both of S.C.

[73] Assignee: Ryobi North America Inc., Anderson, S.C.

[21] Appl. No.: 09/163,522

[22] Filed: Sep. 30, 1998

[51] Int. Cl.⁶ .................................................. H02K 5/16
[52] U.S. Cl. ............................................. 310/90; 384/205
[58] Field of Search .............................. 310/90, 91, 50; 384/581, 205

[56] References Cited

U.S. PATENT DOCUMENTS

| | | | |
|---|---|---|---|
| 3,622,821 | 11/1971 | Maffey, Jr. .............................. 310/60 R |
| 4,523,116 | 6/1985 | Dibbern, Jr. et al. ..................... 310/71 |
| 4,694,214 | 9/1987 | Stewart, Sr. ............................. 310/239 |
| 4,897,571 | 1/1990 | Isozumi .................................... 310/239 |
| 4,926,078 | 5/1990 | Isozumi et al. ............................ 310/71 |
| 4,967,111 | 10/1990 | Andrieux et al. .......................... 310/90 |
| 5,132,580 | 7/1992 | Aoki et al. ............................... 310/239 |
| 5,218,256 | 6/1993 | Umezawa et al. ........................ 310/90 |
| 5,449,963 | 9/1995 | Mok ........................................ 310/270 |
| 5,494,356 | 2/1996 | Strobl ...................................... 384/204 |
| 5,633,542 | 5/1997 | Yuhi et al. ......................... 310/40 MM |
| 5,801,468 | 9/1998 | Choi ......................................... 310/90 |

OTHER PUBLICATIONS

Underwriters Laboratories, Standard UL 745–1.

Primary Examiner—Nestor Ramirez
Assistant Examiner—Joseph Waks
Attorney, Agent, or Firm—Brooks & Kushman P.C.

[57] ABSTRACT

An armature assembly for use in a motor has an annual creepage shield received on the armature shaft between the bearing and the commutator. The creepage shield has a first face adjacent to the commutator, and a second face adjacent to the bearing. The second face has at least one generally annular surface interruption to increase effective creepage distance between the commutator and the bearing.

20 Claims, 4 Drawing Sheets

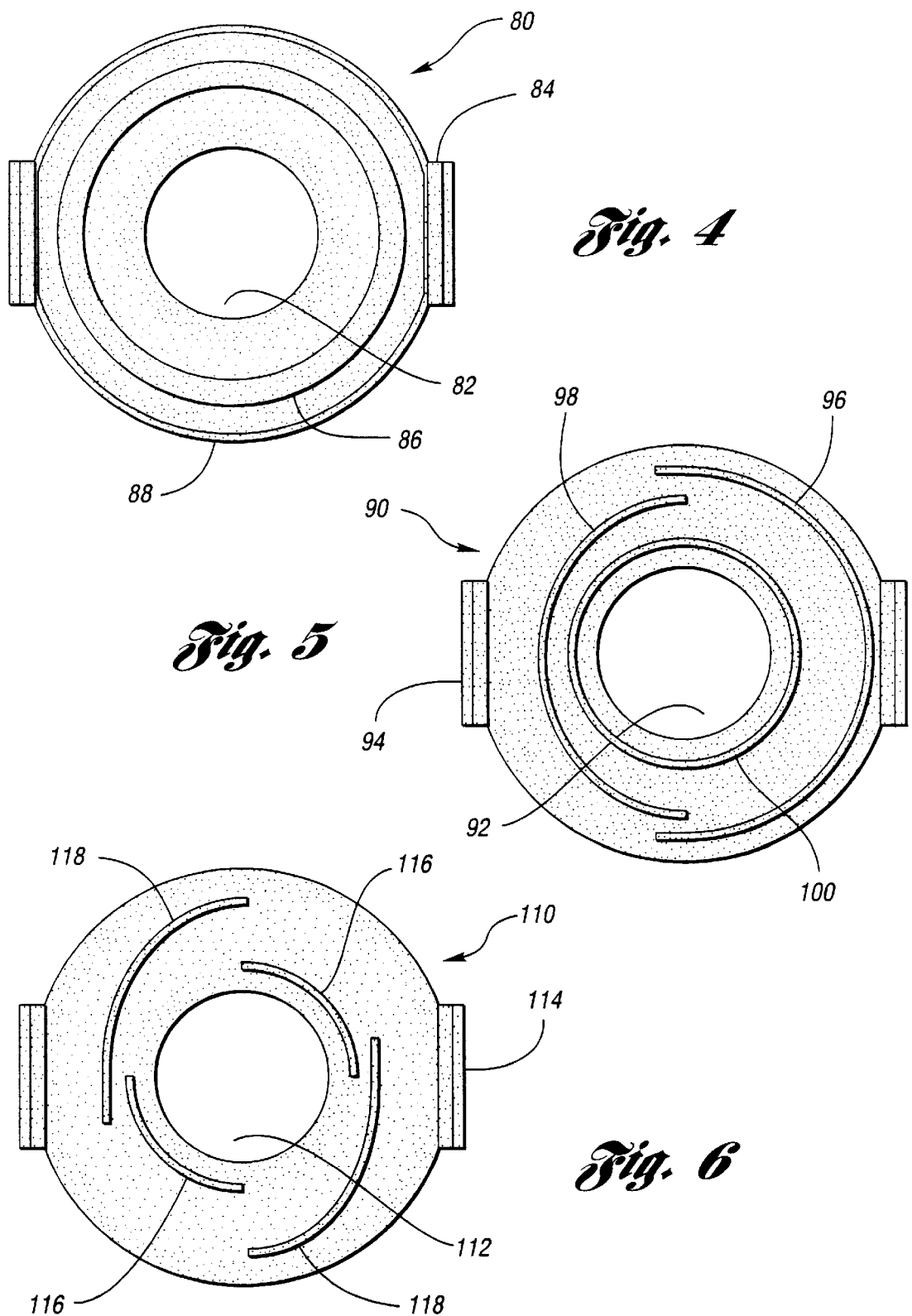

ARMATURE ASSEMBLY WITH CREEPAGE SHIELD

TECHNICAL FIELD

The present invention relates to armature assemblies and motor assemblies.

BACKGROUND ART

Motor assemblies are used in a variety of applications such as, for example, portable electric tools and vacuum cleaners. A typical motor assembly includes a housing with a field disposed therein. The field may be formed by a plurality of permanent magnets or by field windings. An armature assembly extends through the field. The armature assembly generally includes a rotatable armature shaft extending through the housing, and a commutator affixed generally adjacent to an end of the armature shaft for rotation together with the armature shaft. A pair of brushes affixed to the housing contact the commutator. The brushes are held by brush holders and connect to the motor terminals. Both ends of the armature shaft are supported by bearings.

Due to the widespread use of motor assemblies, various safety standards have been developed for minimum distances between conducting parts on the motor assembly. In particular, there are safety standards for the distances between the commutator and the bearing supporting the end of the armature shaft where the commutator is located. The distances of interest are the creepage distance, clearance distance, and through material distance from the commutator to the bearing as measured from one of the commutator bars to the bearing when the two parts are in their most unfavorable stationary position relative to each other.

Creepage distance denotes the shortest path between two conductive parts, or between a conductive part and the bounding surface of the tool, measured along the surface of the insulating material. Clearance distance denotes the shortest distance between two conductive parts, or between a conductive part and the bounding surface of the tool, measured through air. The bounding surface of the tool is the outer surface of the enclosure, considered as though metal foil are pressed into contact with accessible surfaces of insulating material. Through material is measured through the insulator. There are various guidelines for determining creepage clearance, and through material distances. For example, UNDERWRITERS LABORATORIES INC. publishes standards for these distances and guidelines for measuring them.

The creepage distance from the commutator to the bearing for a motor assembly has a minimum creepage distance standard of 8.0 mm according to UNDERWRITERS LABORATORIES Standard UL 745-1. The UL standard applies to, among other places, the United States and Canada. Other places in the world have their own standards. For example, according to IEC Standard EN50144-4, the standard for Europe and some other places, the commutator to bearing minimum creepage distance standard is 8.0 mm. Further, the NEW DENTORI Standard, for Japan, requires a commutator to bearing minimum creepage distance of 8.0 mm. Of course, these standards are merely exemplary, and there may be other standards for the commutator to bearing minimum creepage distance.

To meet the commutator to bearing minimum creepage distance requirements, which are 8.0 mm in the standards discussed above, but may be any distance based on the particular motor assembly application and the choice of which standard to follow for the motor assembly design, the bearing at the commutator end of the armature shaft is typically spaced far enough from the commutator so that the measured clearance distance exceeds the minimum creepage distance standard of choice. Because a computed creepage distance is never less than a measured clearance distance, spacing of the bearing far enough from the commutator such that the clearance distance exceeds the creepage distance standard assures that the creepage distance also exceeds the creepage distance standard.

Although motor assembly designs in which the measured clearance exceeds the creepage distance standard have been used in a number of different applications which have been commercially successful, such a design adds to the overall length of the motor assembly. In space restricted applications, such as portable electric tools and vacuum cleaners, it may be desirable to reduce the overall motor assembly length as much as possible while still meeting the selected design standards.

SUMMARY OF THE INVENTION

It is, therefore, an object of the present invention to provide an improved armature assembly for use in a motor having an increased effective creepage distance between the commutator and the bearing in space restricted applications.

In carrying out the above objects and other objects and features of the present invention, an armature assembly for use in a motor is provided. The armature assembly comprises an armature shaft having first and second ends, and a commutator affixed generally adjacent to the armature shaft first end for rotation together with the armature shaft. A bearing is received on the armature shaft first end. An annular creepage shield is received on the armature shaft between the bearing and the commutator. The creepage shield has a first face adjacent to the commutator, and a second face adjacent to the bearing. The second face has at least one generally annular surface interruption to increase effective creepage distance between the commutator and the bearing. In a preferred embodiment, the creepage shield second face abuts the bearing, and the at least one surface interruption comprises a continuous inner ridge abutting the bearing periphery to seat the bearing. Further, in a preferred embodiment, the at least one surface interruption further comprises a continuous outer ridge extending along the creepage shield periphery.

Still further, in a preferred embodiment, the armature assembly includes an end plate received on the armature shaft first end. The end plate includes a pair of brush holders positioned proximate the commutator periphery. The creepage shield preferably includes at least one tabbed member extending away from the creepage shield second face in a snap-fit with at least one slot on the end plate to secure the creepage shield to the end plate.

Further, in carrying out the present invention, a motor assembly is provided. The motor assembly comprises a housing having a field disposed therein, a rotatable armature shaft, a commutator, a pair of brushes, and a bearing received on the armature shaft first end. The motor assembly further comprises an annular creepage shield received on the armature shaft between the bearing and the commutator.

Still further, in carrying out the present invention, a component for use in an armature assembly of a motor assembly is provided. The component comprises an annular creepage shield for placement about the armature shaft between the bearing and the commutator to increase the effective creepage distance between the commutator and the bearing.

The advantages associated with embodiments of the present invention are numerous. For example, the at least one generally annular surface interruption on the annular creepage shield second face increases the effective creepage distance between the commutator and the bearing. Different configurations for the surface interruption may be employed based on the minimum creepage distance standard chosen for the motor assembly design. Further, preferred embodiments of the present invention facilitate assembly of the creepage shield to an armature assembly end plate. Still further, the increased creepage distance capabilities of the present invention allow for reduced overall motor length in space restricted applications, such as portable electric tools and vacuum cleaners.

The above objects and other objects, features, and advantages of the present invention are readily apparent from the following detailed description of the best mode for carrying out the invention when taken in connection with the accompanying drawings.

BRIEF DESCRIPTION IF THE DRAWINGS

FIG. 4 is a plan view of the creepage shield on the assembly shown in FIG. 1;

FIG. 5 is a plan view of a first alternative embodiment of the present invention, showing an annular creepage shield having two distinct surface interruptions which together form an annular surface interruption, in addition to another annular surface interruption forming a bearing seat; and FIG. 6 is a plan view of a second alternative embodiment of the present invention, showing an annular creepage shield having four distinct surface interruptions which together form an annular surface interruption and a bearing seat.

BEST MODE FOR CARRYING OUT THE INVENTION

Figure 1:
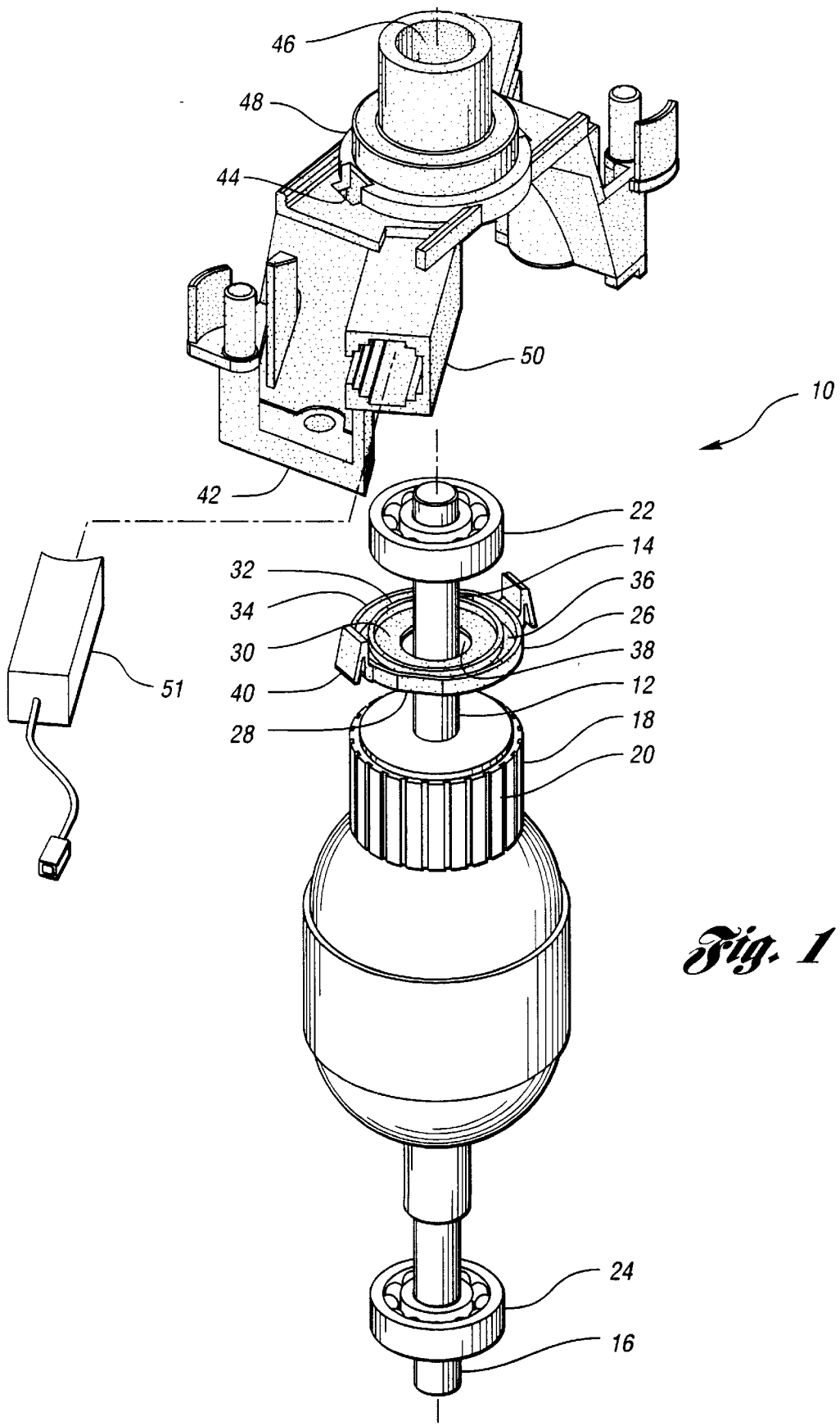
FIG. 1 is an exploded perspective view of an armature assembly for use in a motor, made in accordance with the present invention.
Figure 2:
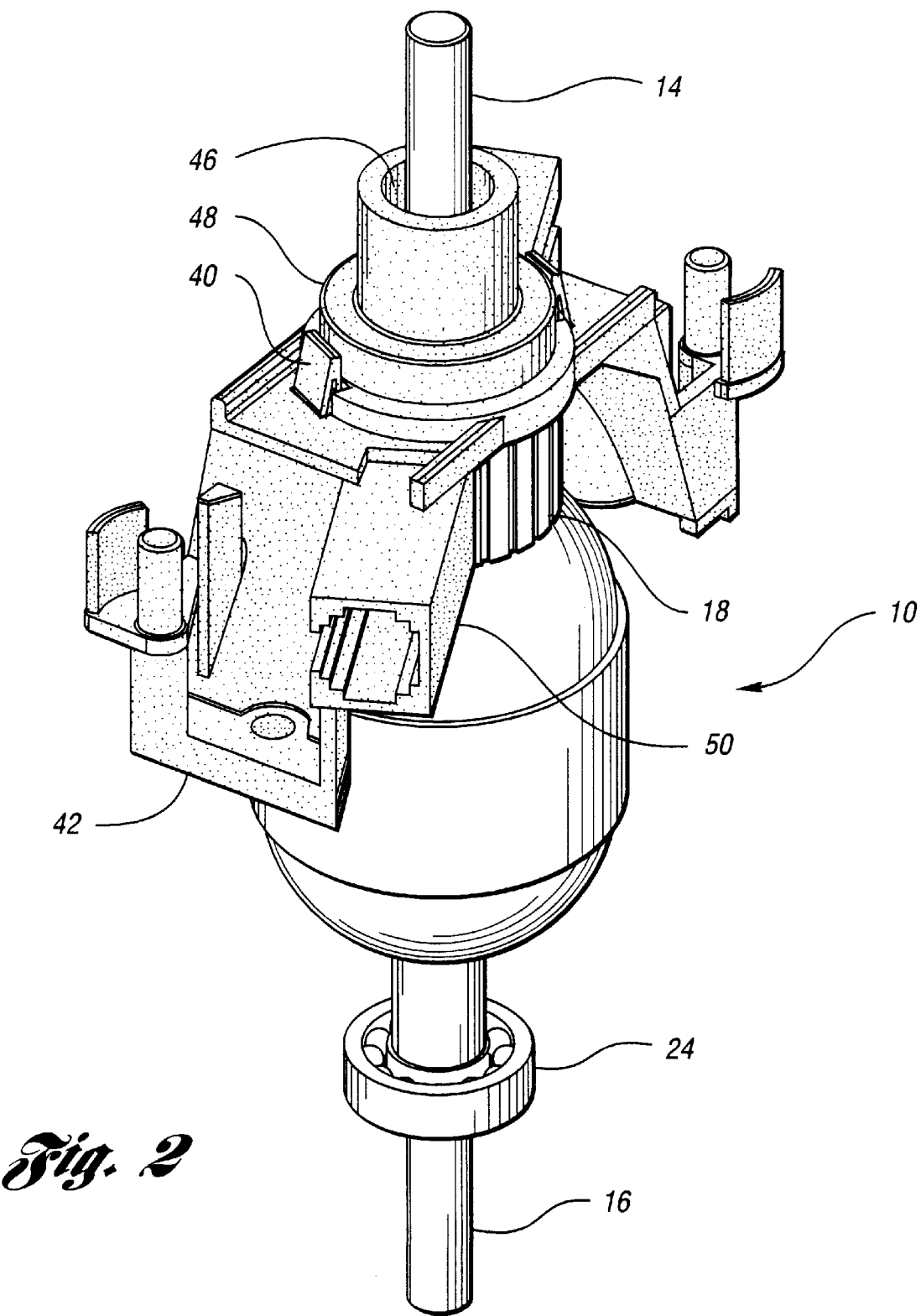
FIG. 2 is a perspective view of the armature assembly of FIG. 1, showing an assembled armature assembly.

With reference to FIGS. 1 and 2, an armature assembly of the present invention is generally indicated at 10. Armature assembly 10 includes an armature shaft 12 having a first end 14 and a second end 16. A commutator 18 is affixed generally adjacent to armature shaft first end 14 for rotation together with armature shaft 12. Commutator 18 includes a plurality of commutator bars 20 circumferentially spaced about commutator 18 and extending in an axial direction. A bearing 22 is received on armature shaft first end 14. Another bearing 24 is received on armature shaft second end 16. Armature assembly 10 includes armature windings (not specifically shown) which may be, for example, a lap winding, a wave winding, or a combination of lap and wave windings. The armature windings may be connected to commutator bars 20 as is known in the art.

An annular creepage shield 26 has a first face 28 adjacent to commutator 18 and a second face 30 adjacent to first bearing 22. Creepage shield 26 is received on armature shaft 12 between bearing 22 and commutator 18.

Second face 30 of creepage shield 26 has at least one generally annular surface interruption to increase effective creepage distance between commutator 18 and bearing 22.

The effective creepage distance is the distance between commutator 18 and bearing 22 as measured along the surface of creepage shield 26 which is an insulator. Effective creepage distance is measured in a generally radial direction along creepage shield 26 when armature assembly 10 is assembled. The effective creepage distance generally contours second face 30 of creepage shield 26, generally following any surface interruptions in second face 30 of creepage shield 26. Because the effective creepage distance is measured between a commutator bar and the bearing when the commutator bar and bearing in the most unfavorable stationary positions relative to each other, the at least one generally annular surface interruption on second face 30 is annular to the extent necessary to increase effective creepage distance in the most unfavorable stationary position of bearing 22 relative to commutator 18.

That is, the term "generally annular surface interruption" as used herein means any portion of second face 30 of creepage shield 26 that extends out of the general plane of second face 30. The generally annular surface interruptions may take many forms, such as one or more continuous or discontinuous ridges, one or more continuous or discontinuous gaps. Further, complex combinations of ridges and/or gaps may be employed as generally annular surface interruptions.

Further, the effective creepage distance generally contours the surface of second face 30 to the extent defined by the minimum creepage distance standards adopted for design of the armature assembly. For example, UNDERWRITERS LABORATORIES Standard UL 745-1 defines effective creepage distance as following the insulator surface except for certain exceptions. For example, according to the current UNDERWRITERS LABORATORIES Standard UL 745-1, gaps of less than 1 mm in width (0.25 mm for dirt-free situations) are ignored when measuring effective creepage distance. That is, effective creepage distance is measured directly across the gap. The exceptions to the general rule of creepage distance precisely following the insulator surface may vary based on the standard chosen for the armature assembly design.

It is to be appreciated that the term "effective creepage distance" as used herein means the effective creepage distance according to the chosen design standard.

In a preferred embodiment of the present invention, the design criterion for minimum effective creepage distance between the commutator and the bearing is 8.0 mm as indicated in current UNDERWRITERS LABORATORIES Standard UL 745-1. Further, creepage distance is preferably measured according to UNDERWRITERS LABORATORIES Standards, as described in Standard UL 745-1, Appendix D, which is hereby incorporated by reference in its entirety.

Further, it is to be appreciated that the term "annular" as used herein to describe the surface interruption on second face 30 means generally annular and either continuous or discontinuous. That is, many surface interruptions at different angular and radial positions on second face 30 may define numerous discontinuities, while effectively increasing creepage distance between commutator 18 and bearing 22 along all paths, including the most unfavorable stationary position of commutator 18 relative to bearing 22.

In a preferred embodiment, creepage shield second face 30 abuts bearing 22. The surface interruption comprises an inner ridge 32 abutting the bearing periphery to seat bearing 22. Preferably, inner ridge 32 is continuous. However, inner ridge 32 may have one or more discontinuities. At each discontinuity, the generally annular surface interruption may take a different form than inner ridge 32. For example, gaps or additional ridges or other features located at different radial distances on second face 30, together with inner ridge 32, may form the generally annular surface interruption required to increase effective creepage distance.

Further, in a preferred embodiment, the surface interruption further comprises an outer ridge 34 extending along the creepage shield periphery. Preferably, outer ridge 34 is continuous. However, outer ridge 34 may have one or more discontinuities. Such discontinuities may be compensated for by various other surface interruptions on second face 30 which, in combination with outer ridge 34, and possibly in combination with inner ridge 32, form the generally annular surface interruption sufficiently to increase effective creepage distance between commutator 18 and bearing 22.

With continuing reference to FIGS. 1 and 2, inner ridge 32 and outer ridge 34 define a gap 36 therebetween. Armature shaft 12 extends through a hole 36 in creepage shield 26. Creepage shield 26 preferably includes at least one tabbed member 40 extending away from creepage shield second face 30.

An end plate 42 has slots 44 corresponding to tabs 40. Slots 44 receive tabs 40 in a snap-fit to secure creepage shield 26 to end plate 42. End plate 42 has a hole 46 through which armature shaft 12 extends. Further, end plate 42 defines a bearing chamber 48 in which bearing 22 is received during assembly. Preferably, end plate 42 includes a pair of brush holders 50 that receive the motor brushes 51.

In one construction, creepage shield 26 is received on armature shaft 12 prior to bearing 22. Bearing 22 is then received on armature shaft 12 in an interference fit. Thereafter, creepage shield 26 and end plate 42 are snap-fit together to secure creepage shield 26 to end plate 42. Of course, there are many other configurations other than a tab and slot arrangement to secure creepage shield 26 to end plate 42. For example, if desired, fasteners or other techniques may be used to secure creepage shield 26 to end plate 42.

In another construction, bearing 22 has a clearance fit with armature shaft 12. Accordingly, bearing 22 may be position between creepage 26 and end plate 42, with creepage shield 26 and end plate 42 secured together, such as with a tab and slot arrangement. The assembled end plate 42 and creepage shield 26, with bearing 22, is then slipped over armature shaft 12.

In both constructions, armature assembly 10 may be of the stack-up type assembly in which the armature assembly is axially placed into a housing, or may be of the clam-shell type wherein two (or more) housing halves are closed together over the armature assembly. Preferably, armature assembly 10 is of the stack-up type. The annular surface interruption or interruptions advantageously allow the creepage shield diameter to be reduced without reducing the effective creepage distance between the commutator and the bearing. Particularly, in stack-up type motor designs, creepage shield diameter is physically limited by the brush holders, as best shown in the FIGS. 1–3.

Figure 3:
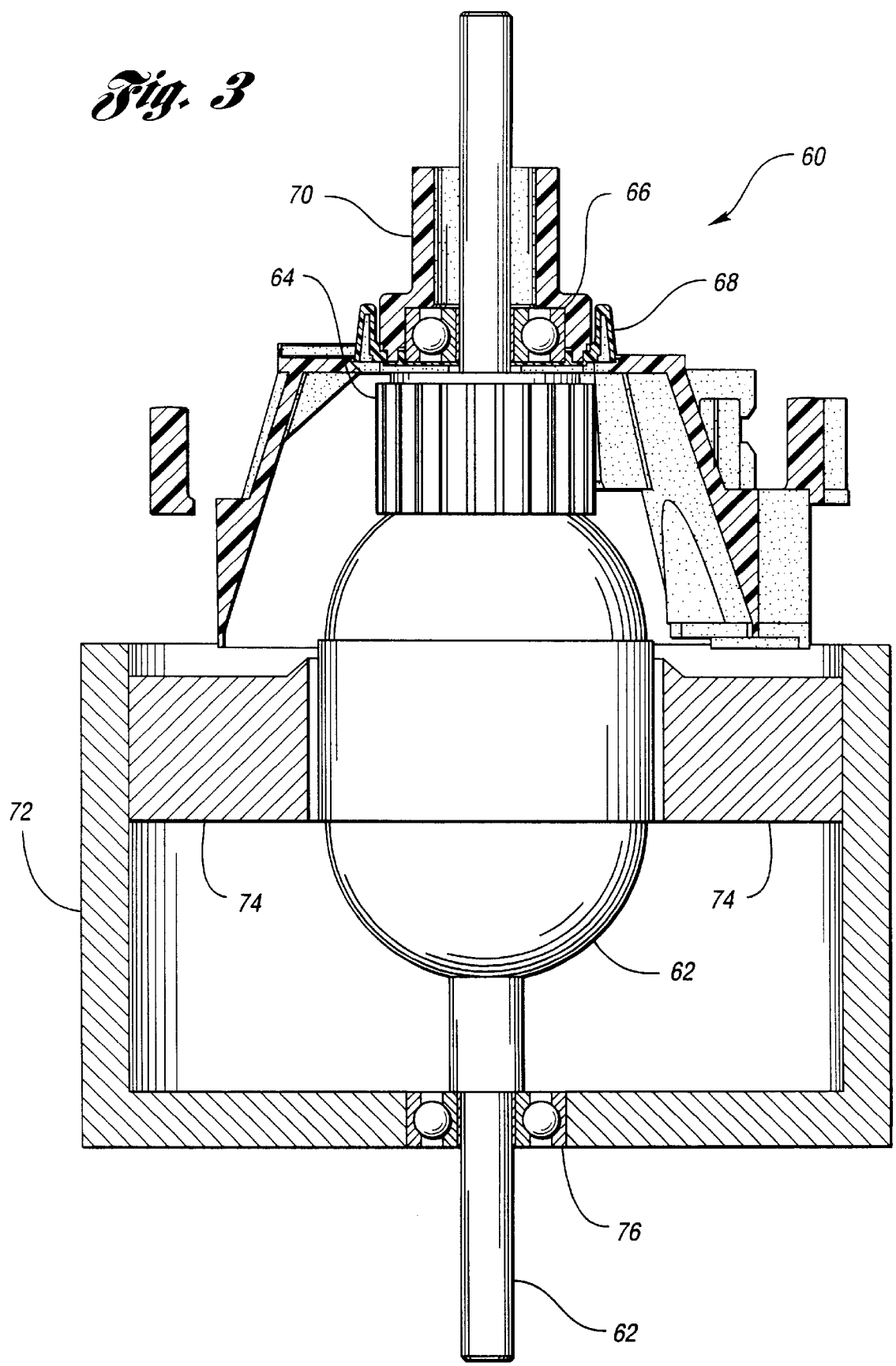
FIG. 3 is a sectional view of a motor assembly of the present invention, showing the housing, field, and armature assembly.

With reference to FIG. 3, a motor assembly 60 of the present invention is illustrated. Motor assembly 60 includes an armature shaft 62, a commutator 64, a bearing 66, and a creepage shield 68 between commutator 64 and bearing 66. An end plate 70 is secured to a housing 72. Housing 72 encloses field 74. A bearing 76 supports the armature shaft 62 at the armature shaft end opposite commutator 64. It is to be appreciated that motor assembly 60 is of the stack-up type and may be fitted with a stack-up type housing placed over end plate 20, or may be enclosed in a clam-shell type housing to form a stack-up motor assembly in a clam-shell housing. Of course, the motor assembly may alternatively be constructed as a true clam-shell type motor assembly, wherein the end plate is omitted, and components are positioned in a clam-shell half.

With reference to FIG. 4, an annular creepage shield 80 has a hole 82 for receiving the armature shaft therethrough. Preferably, tabbed members 84 are provided at the periphery of annular creepage shield 80 for securing creepage shield 80 to the armature assembly end plate. As shown, annular surface interruptions are formed by inner and outer ridges 86 and 88, respectively.

With reference to FIG. 5, a first alternative embodiment of the present invention is illustrated. An annular creepage shield 90 has a center hole 92, and tabbed members 94. First and second distinct surface interruptions 96 and 98, respectively, together form an annular surface interruption. First and second distinct surface interruptions 96 and 98, respectively, may both be ridges, both be gaps, or one of the interruptions may be formed as a ridge and the other formed as a gap. It is to be appreciated that the annular surface interruption for increasing effective creepage distance may be formed by any number of distinct surface interruptions (ridges, gaps, or other types) which are positioned such that the most unfavorable position of the commutator and bearing results in a creepage path along the creepage shield that is less than the standard used for motor assembly design. An additional annular interruption 100 acts as a bearing seat.

With reference to FIG. 6, a second alternative annular creepage shield 110 has a center hole 112, and tabbed members 114. As shown, a discontinuous inner ridge is formed by opposed partial ridge type surface interruptions 116. Ridges 116 provide a seat for the bearing. Ridges 116 cooperate with another pair of surface interruptions 118. Surface interruptions 118 may be ridges, gaps, a combination of ridges and gaps, or any other such surface interruption, as desired. It is to be appreciated, as shown in FIGS. 4–6, that the annular surface interruption may take many forms, and is not limited to those specifically illustrated.

It is to be appreciated that the drawings illustrate several embodiments for the annular creepage shield, and that there are many additional possibilities for continuous and discontinuous surface interruptions which may be ridges, gaps, combinations of ridges and gaps, or other types of surface interruptions that may be better classified as something other than a ridge or a gap. The surface interruptions on a particular annular creepage shield are positioned such that the shortage creepage path from any point on the outside edge of the creepage shield (at the commutator) to any point on the inside edge of the creepage shield (at the bearing) exceeds the minimum distance given in whichever standards are used for design. Further, the techniques used to measure creepage distance is a design choice.

While the best mode for carrying out the invention has been described in detail, those familiar with the art to which this invention relates will recognize various alternative designs and embodiments for practicing the invention as defined by the following claims.

What is claimed is:

1. An armature assembly for use in a motor, the assembly comprising:

an armature shaft having first and second ends;

a commutator affixed generally adjacent to the armature shaft first end for rotation together with the armature shaft;

a bearing received on the armature shaft first end; and an annular creepage shield received on the armature shaft between the bearing and the commutator, the creepage shield having a first face immediately adjacent and in close proximity to the commutator, and a second face adjacent to and abutting the bearing, the second face having at least one generally annular surface interruption to increase effective creepage distance between the commutator and the bearing.

2. The assemble of claim 1 wherein the at least one surface interruption comprises:

an inner ridge abutting the bearing periphery to seat the bearing.

3. The assembly of claim 2 wherein the inner ridge is continuous.

4. The assembly of claim 1 wherein the at least one surface interruption comprises:

an outer ridge extending along the creepage shield periphery.

5. The assembly of claim 4 wherein the outer ridge is continuous.

6. The assembly of claim 1 wherein the bearing is received on the armature shaft first end in an interference fit.

7. The assembly of claim 1 wherein the at least one surface interruption comprises:

an annular gap extending about the second face.

8. The assembly of claim 1 further comprising:

an end plate received on the armature shaft first end, the end plate defining an annular opening receiving the armature shaft therethrough, and the end plate including a pair of brush holders positioned proximate the commutator periphery, wherein the end plate and the creepage shield are secured together to retain the bearing therebetween.

9. The assembly of claim 8 wherein the creepage shield further comprises:

at least one tabbed member extending away from the creepage shield second face, wherein the end plate has at least one slot receiving the at least one tabbed member in a snap-fit to secure the creepage shield to the end plate.

10. A motor assembly comprising:

a housing;

a field disposed in the housing;

a rotatable armature shaft extending through the housing and having first and second ends;

a commutator affixed generally adjacent to the armature shaft first end for rotation together with the armature shaft;

a pair of brushes affixed to the housing and contacting the commutator;

a bearing received on the armature shaft first end; and an annular creepage shield received on the armature shaft between the bearing and the commutator, the creepage shield having a first face immediately adjacent and in close proximity to the commutator, and a second face adjacent to and abutting the bearing, the second face having at least one generally annular surface interruption to increase effective creepage distance between the commutator and the bearing.

11. The assembly of claim 10 wherein the at least one surface interruption comprises:

an inner ridge abutting the bearing periphery to seat the bearing.

12. The assembly of claim 11 wherein the inner ridge is continuous.

13. The assembly of claim 10 wherein the at least one surface interruption comprises:

an outer ridge extending along the creepage shield periphery.

14. The assembly of claim 11 wherein the outer ridge is continuous.

15. The assembly of claim 10 wherein the bearing is received on the armature shaft first end in an interference fit.

16. The assembly of claim 10 wherein the at least one surface interruption comprises:

an annular gap extending about the second face.

17. The assembly of claim 10 further comprising:

an end plate received on the armature shaft first end, the end plate defining an annular opening receiving the armature shaft therethrough, and the end plate including a pair of brush holders positioned proximate the commutator periphery, wherein the end plate and the creepage shield are secured together to retain the bearing therebetween.

18. The assembly of claim 17 wherein the creepage shield further comprises:

at least one tabbed member extending away from the creepage shield second face, wherein the end plate has at least one slot receiving the at least one tabbed member in a snap-fit to secure the creepage shield to the end plate.

19. For use in an armature assembly of a motor, the armature assembly including an armature shaft having first and second ends, a commutator affixed generally adjacent to the armature shaft first end for rotation together with the armature shaft, and a bearing received on the armature shaft first end, a component comprising:

an annular creepage shield for placement about the armature shaft between the bearing and the commutator, the creepage shield having a first face immediately adjacent and in close proximity to the commutator, and a second face adjacent to and abutting the bearing when placed about the armature shaft, the second face having at least one generally annular surface interruption to increase effective creepage distance between the commutator and the bearing.

20. The component of claim 19 wherein the creepage shield further comprises:

at least one tabbed member extending away from the creepage shield second face for securing the creepage shield to an end plate with a corresponding slot.

* * * * *